US008396162B2

(12) United States Patent
Thomas et al.

(10) Patent No.: US 8,396,162 B2
(45) Date of Patent: Mar. 12, 2013

(54) METHOD AND APPARATUS FOR CHOOSING A MODULATION AND CODING RATE IN A MULTI-USER, MIMO COMMUNICATION SYSTEM

(75) Inventors: Timothy A. Thomas, Palatine, IL (US); Amitabha Ghosh, Buffalo Grove, IL (US); Bishwarup Mondal, Rolling Meadows, IL (US)

(73) Assignee: Motorola Mobility LLC, Libertyville, IL (US)

( * ) Notice: Subject to any disclaimer, the term of this patent is extended or adjusted under 35 U.S.C. 154(b) by 873 days.

(21) Appl. No.: 12/263,590

(22) Filed: Nov. 3, 2008

(65) Prior Publication Data
US 2010/0111223 A1 May 6, 2010

(51) Int. Cl.
*H04L 25/03* (2006.01)

(52) U.S. Cl. ........ 375/296; 375/262; 375/260; 375/267; 375/295; 375/259; 375/261

(58) Field of Classification Search .................. 375/296, 375/262, 260, 267, 295, 259, 261
See application file for complete search history.

(56) References Cited

U.S. PATENT DOCUMENTS

| | | | | |
|---|---|---|---|---|
| 2006/0281494 A1* | 12/2006 | Wilson et al. | ............... | 455/562.1 |
| 2007/0049218 A1* | 3/2007 | Gorokhov et al. | ............ | 455/102 |
| 2007/0092019 A1* | 4/2007 | Kotecha et al. | ............... | 375/267 |
| 2008/0076370 A1* | 3/2008 | Kotecha et al. | ............ | 455/187.1 |
| 2008/0165875 A1* | 7/2008 | Mundarath et al. | ........... | 375/262 |
| 2008/0316935 A1* | 12/2008 | Bala et al. | ...................... | 370/252 |
| 2009/0291702 A1* | 11/2009 | Imai et al. | ...................... | 455/517 |
| 2010/0014500 A1* | 1/2010 | Lee et al. | ...................... | 370/342 |
| 2010/0034146 A1* | 2/2010 | Hou et al. | ...................... | 370/328 |
| 2010/0035555 A1* | 2/2010 | Bala et al. | .................... | 455/63.1 |
| 2010/0142633 A1* | 6/2010 | Yu et al. | ........................ | 375/260 |
| 2010/0232534 A1* | 9/2010 | Lee et al. | ...................... | 375/267 |

OTHER PUBLICATIONS

Freescale Semiconductor Inc., "R1-071510, Details of Zero-Forcing MU-MIMO for DL EUTRA," 3GPP TSG RAN WG1 Meeting #48, St. Julian, Malta, Mar. 26-30, 2007.
Samsung, "R1-072237, Performance Evaluation of Different MU-MIMO Schemes," 3GPP TSG RAN WG1 Meeting #49, Kobe, Japan, May 7-11, 2007.
Samsung, "R1-060335, Downlink MIMO for EUTRA," 3GPP TSG RAN WG1 Meeting #44, Denver, Colorado, USA, Feb. 13-17, 2006.
Huawei, "R1-071411, Performance Comparison of MU-MIMO Schemes," 3GPP TSG RAN WG1 Meeting #48, St. Julian, Malta, Mar. 26-30, 2007.
Nokia and Nokia Siemens Networks, "R1-072983, Channel Quality indicator (CQI) Reporting for LTE MU-MIMO," 3GPP TSG RAN WG1 Meeting #49, Orlando, Florida, Jun. 25-29, 2007.

* cited by examiner

*Primary Examiner* — Kenneth Lam

(57) ABSTRACT

A method and apparatus for choosing a modulation and coding rate in a MU-MIMO communication system is provided herein. During operation, a node will determine the MCR to feed back to the base even though the mobile does not know which of the possible interferers (if any) will be using the same time/frequency resources as the mobile. This takes place via the mobile node calculating best antenna weights (codebook choice) for each group of subcarriers that can be potentially used by the mobile. Transmit weights v for each interferer are then determined and the weights are utilized to determine a best modulation and coding rate for the mobile.

20 Claims, 2 Drawing Sheets

200

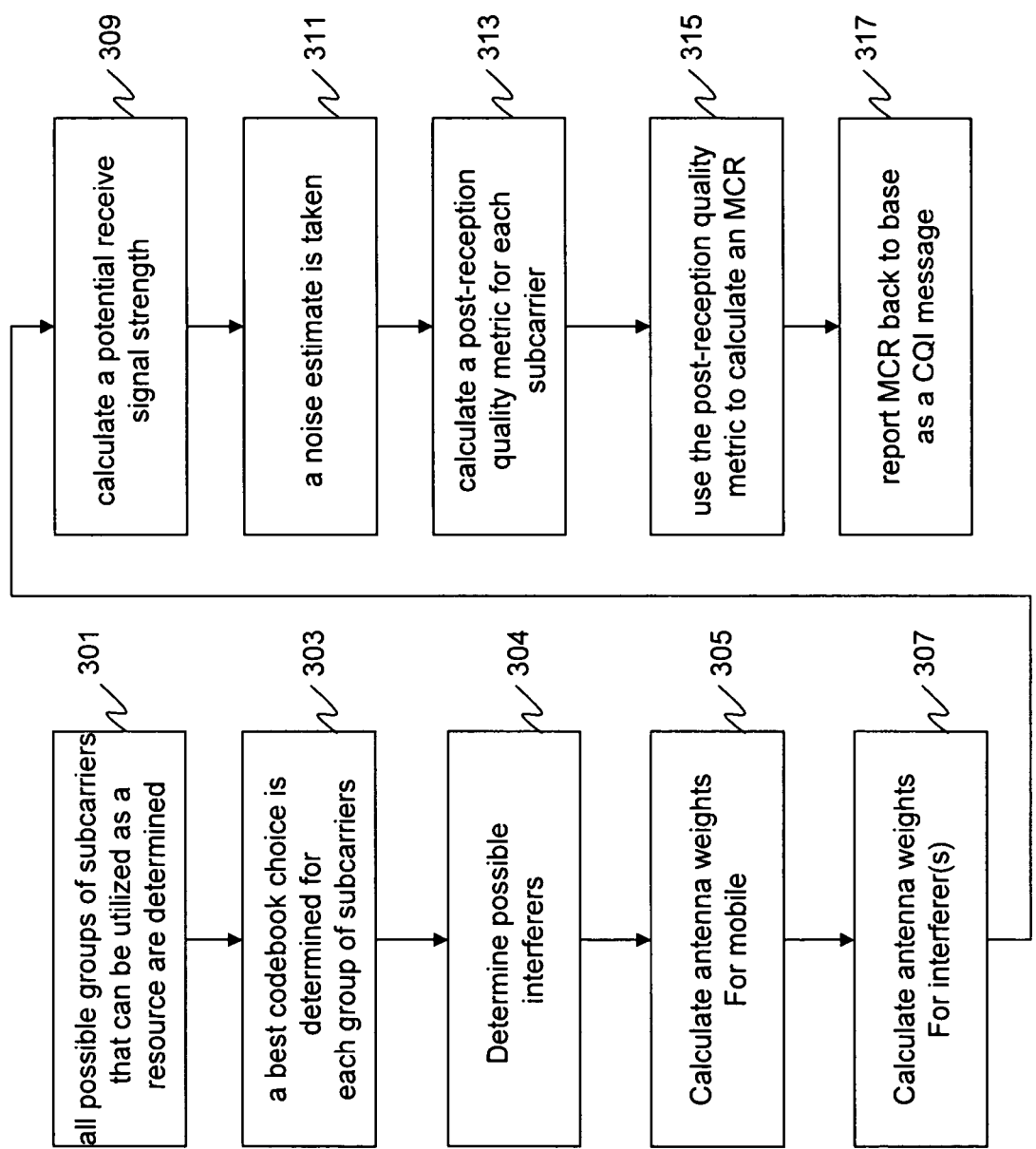

METHOD AND APPARATUS FOR CHOOSING A MODULATION AND CODING RATE IN A MULTI-USER, MIMO COMMUNICATION SYSTEM

FIELD OF THE INVENTION

The present invention relates generally to determining a modulation and coding rate within a communication system, and in particular, to a method and apparatus for choosing a modulation and coding rate in a multi-user MIMO communication system.

BACKGROUND OF THE INVENTION

Downlink multi-user multiple-input, multiple output (MU-MIMO), also known as transmit spatial division multiple access (Tx-SDMA), is a method that enables multiple mobiles to share the same time-frequency resource through downlink beamforming using an antenna array at the base. This is illustrated in FIG. 1. As shown in FIG. 1, MU-MIMO transmit beamforming increases the system-level capacity by transmitting to two mobiles on the same time-frequency resource by creating two transmit beams patterns 101 and 103. Transmit beam pattern 103 maximizes the power to mobile 1 and transmits little power toward mobile 2 whereas transmit beam pattern 101 maximizes the power to mobile 2 and transmits little power toward mobile 1. This type of beamforming is accomplished by employing multiple antennas 102 at the transmit site and weighting each antenna such that the combined transmissions result in a beamformed pattern that enables two data streams to be transmitted on the same time-frequency resource where one data stream is destined for mobile 1 and the other data stream is destined for mobile 2.

To enable downlink MU-MIMO, channel information for multiple users is needed at the base station. In time division duplexing (TDD) systems where the uplink and downlink use the same carrier frequency, the channel information is easily obtained by the mobile sounding the uplink and exploiting channel reciprocity. However, in frequency division duplexing (FDD) where the uplink and downlink are on different carrier frequencies, the channel information cannot be obtained with uplink sounding and thus the mobiles have to use some sort of feedback mechanism in order to provide channel information to the base. One method of obtaining this feedback is codebook feedback which is known in the art. In codebook feedback, the base station and the mobiles all use a same codebook which is a collection of B vectors or matrices. A mobile will measure the downlink channel from all base station antennas and then will choose the best codebook vector or matrix that matches the downlink channel. The mobile will feed back this best codebook choice to the base station which can then use this selection to determine the transmit weights on the downlink.

In addition to beamforming, many communication systems may utilize multiple Modulation and Coding rates (MCRs). Particularly, the MCR of a transmitted data stream for a particular receiver can be tailored to predominantly match a current received signal quality (at the receiver) for the particular frame being transmitted. The MCR may change on a frame-by-frame basis in order to track the channel quality variations that occur in mobile communication systems (this method of choosing the MCR is called adaptive modulation and coding). Thus, streams with high quality are typically assigned higher order modulations rates and/or higher channel coding rates with the modulation order and/or the code rate decreasing as quality decreases. For those receivers experiencing high quality, modulation schemes such as 16 QAM or 64 QAM are utilized, while for those experiencing low quality, modulation schemes such as BPSK or QPSK are utilized. Multiple coding rates may be available for each modulation scheme to provide finer MCR granularity, to enable a closer match between the quality and the transmitted signal characteristics (e.g., coding rates of ¼, ½, and ¾ for QPSK; and coding rates of ½ and ⅔ for 16 QAM, etc.).

Besides choosing the best codebook index, the mobile needs to also select the best MCR which is typically fed back in a channel quality indication (CQI) message. Because MU-MIMO has multiple users sharing the same time/frequency resource, it may be difficult for a mobile to know its channel quality prior to users being assigned their time/frequency resource. In other words, because a mobile will not know its possible interferers (i.e., those using the same time/frequency resource), it is difficult for a mobile to determine an MCR that will match the channel quality when all mobiles are assigned their resources. Therefore a need exists for a method and apparatus for choosing a modulation and coding rate in a MU-MIMO communication system that alleviates the above-mentioned difficulties.

BRIEF DESCRIPTION OF THE DRAWINGS

FIG. 3. is a flow chart showing operation of the node of FIG. 2.

Figures 1, 2:
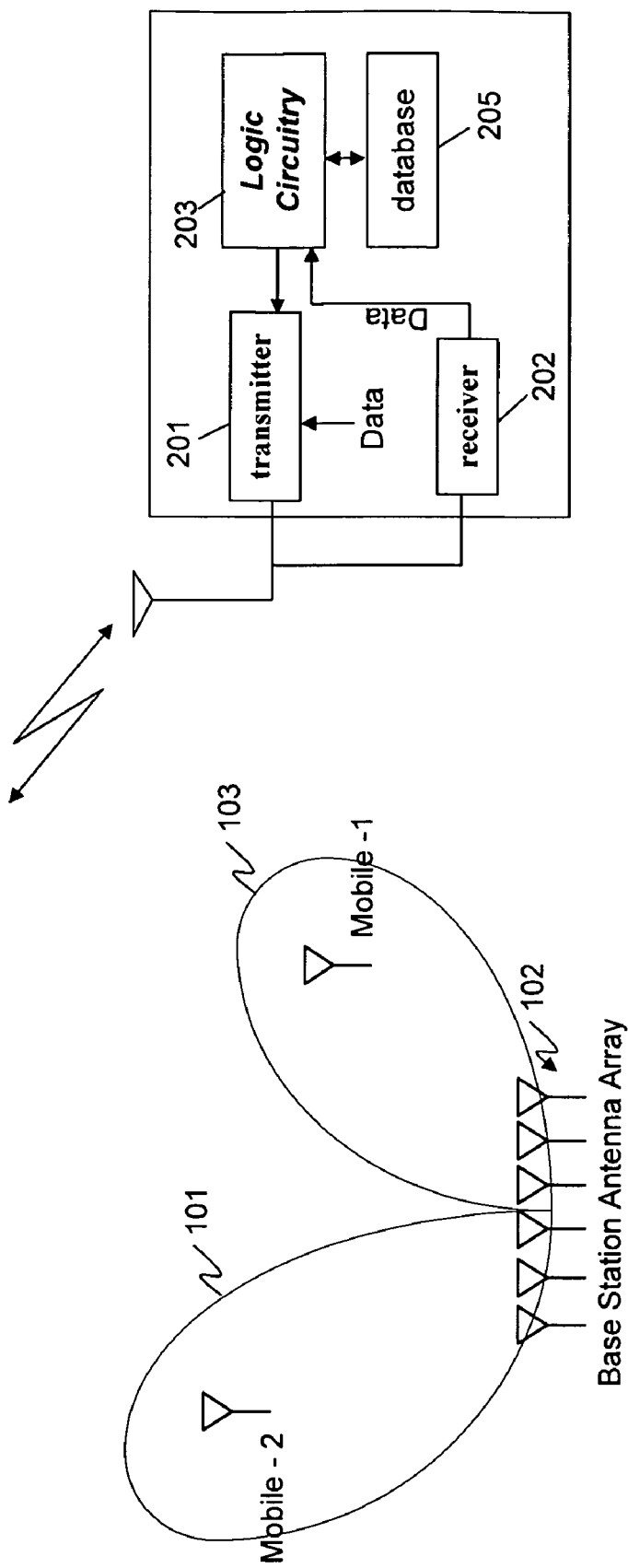
FIG. 1 is a block diagram of a MU-MIMO communication system.
FIG. 2. is a block diagram of a node in a MU-MIMO communication system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for choosing a modulation and coding rate (MCR) in a MU-MIMO communication system is provided herein. During operation, a node will determine the MCR to feed back to the base even though the mobile does not know which of the possible interferers (if any) will be using the same time/frequency resources as the mobile. This takes place via the mobile node calculating a best codebook choice for each group of subcarriers that can be potentially used by the mobile. Next transmit weights v for each possible interferer given the codebook selection are then determined and the weights are utilized to determine a best modulation and coding rate for the mobile.

The above-described procedure allows mobile units to determine a modulation and coding rate for each resource prior to being assigned a resource and MU-MIMO interferer by the base station.

The present invention encompasses a method for a mobile to determine a best modulation and coding rate for a resource within a communication system employing adaptive modulation and coding and transmit spatial division multiple access. The method comprises the steps of determining a codebook choice for the resource, determining one or more possible interferers, determining antenna weights for the mobile, and determining antenna weights for the possible interferers based on the codebook choice. The antenna weights for one or more possible interferers and the antenna weights for the mobile are used to determine a modulation and coding rate for the mobile.

The present invention additionally comprises a mobile to determine a best modulation and coding rate for a resource within a communication system employing adaptive modulation and coding and transmit spatial division multiple access. The mobile performs the steps of determining a codebook choice for the resource, determining one or more possible interferers, determining antenna weights for the mobile, and determining antenna weights for the possible interferers based on the codebook choice. The antenna weights for one or more possible interferers and the antenna weights for the mobile are used to determine a modulation and coding rate for the mobile.

Finally, the present invention encompasses a mobile to determine a best modulation and coding rate for a resource within a communication system employing adaptive modulation and coding and transmit spatial division multiple access. The mobile comprises a database and logic circuitry determining a codebook choice for the resource, determining one or more possible interferers, determining antenna weights for the mobile, determining antenna weights for the possible interferers from the database and based on the codebook choice, and using the antenna weights for one or more possible interferers and the antenna weights for the mobile to determine a modulation and coding rate for the mobile.

For the following text, it will be assumed that only a single data stream is to be sent to each mobile. Also an orthogonal frequency division multiplexing (OFDM) system will be assumed where k indicates the subcarrier and b the OFDM symbol number. Let there be $N_u$ MU-MIMO users to be transmitted to, $M_T$ antennas at the transmitter (base), and $M_R$ antennas at the receiver (mobile). The received $M_R \times 1$ signal at mobile m is given as:

$$Y_m(k, b) = H_m(k, b) \sum_{u=1}^{N_u} v_u(k) x_u(k, b) + N_m(k, b) \quad (1)$$

where $M_R \times M_T$ $H_m(k,b)$ is mobile m's channel, $v_u(k)$ is the $M_T \times 1$ MU-MIMO weight for mobile u ($v_u(k)$ is assumed not to change in time over a transmitted frame but may change from frame to frame), $x_u(k,b)$ is mobile u's data, and $N_m(k,b)$ is additive noise with covariance matrix $\sigma_m^2 I$ where $I_m$ is an m×m identity matrix and $\sigma_m^2$ is the noise power on each receive antenna. Note that $v_u(k)$ in general can change across frequency but in many cases will be fixed over some number of subcarriers. Thus for simplicity, $v_u(k)$ will be assumed to be fixed (constant) over groups (or clusters) of K subcarriers so that only one codebook index will need to be fed back for each group of K subcarriers. Also note that only a single data stream ($x_u(k,b)$) is transmitted to each mobile. However it is straightforward to extend this description to the case where there are multiple data streams sent to each mobile.

The MU-MIMO method described above will require only a rank 1 (i.e., vector) codebook and in general will follow prior-art procedures described in B. Mondal, et. al., "An Algorithm for 2-User Downlink SDMA Beamforming with Limited Feedback for MIMO-OFDM Systems," in *Proc. ICASSP 2007*, Honolulu, Hi., Apr. 15-20, 2007, for designing the MU-MIMO weights.

The use of just vector-based feedback as opposed to matrix feedback simplifies the computation and also enables the use of the same codebook index selection for rank-1 SU-MIMO and MU-MIMO. However, the use of vector codebook is not limiting and a matrix codebook could also be used with the following CQI mechanism. To simplify the description, assume that there are only $N_u=2$ mobiles to be paired for MU-MIMO transmission (i.e., the mobile and the MU-MIMO interferer) and that there are B codebook vectors denoted $c_1$ through $c_B$. Any well designed codebook as is known in the art can be used.

MU-MIMO Weight Calculation

Given a set of transmit MU-MIMO weights for each codebook vector, a CQI method is then utilized to determine a modulation and coding rate which is fed back to the base. The CQI method described below is not limited to the exact transmit weights, but for simplicity two options for computing the set of transmit MU-MIMO weights are considered which are zero forcing with regularization and subspace averaging as are known in the art. Assume that one mobile chooses codebook vector $c_m$ and the mobile which will get paired with that mobile chooses codebook vector $c_n$. For the two given codebook vectors, $c_m$ and $c_n$, the zero-forcing weights, $v_{m,n}$, are given by ($v_{m,n}$ is the MU-MIMO weight used for the mobile that selected index m when n is the index chosen by the other mobile):

$$v_{m,n} = ((c_m c_m^H + c_n c_n^H + \alpha I_{M_T})^{-1} c_m)^* \quad (2)$$

where * indicates conjugation and α is the regularization factor which controls the depth of the null steered. For example, α=0 would steer a perfect null in the direction of $c_n$ (true zero forcing) whereas a higher α steers more energy in the direction of $c_m$ and less of a null in the direction of $c_n$. The regularization factor is a good feature since a perfect null can only be steered toward a mobile only when $c_n$ is exactly matched to its channel over all subcarriers in the data allocation and the channel does not change from the time it is measured and the time that the MU-MIMO weights are applied. The regularization factor is also good because each mobile likely can tolerate a level of crosstalk as long as the crosstalk is less than the noise power seen by the mobile.

The second option for computing the MU-MIMO weights uses a subspace averaging to tradeoff the null depth and signal power. These weights are computed as follows:

$$v_{m,n} = (\text{avg}(c_m, P_n c_m))^* \quad (3)$$

where avg(a,b) is the dominant eigenvector of $aa^H + bb^H$ and $M_T \times M_T$ $P_n$ is given as:

$$P_n = I_{M_T} - \frac{c_n c_n^H}{c_n^H c_n} \quad (4)$$

Note that since there are a finite number of codebook vectors, the MU-MIMO weights for either zero forcing or subspace averaging can be precomputed and stored. Thus the transmit weights could be known by either end once the determination is made of which mobiles are paired for the MU-MIMO transmission.

A third option for MU-MIMO weights is to use directly the codebook vector chosen by the mobile:

$$v_{m,n} = c_m. \quad (5)$$

In this method a mobile that chose codebook $c_n$ is normally only paired with the mobile that chose codebook cm if $c_n$ is orthogonal to $c_m$. Typically not just any two mobiles can be arbitrarily paired for transmission. In reality if one mobile selects codebook vector $c_m$, then it is likely that not all other B−1 codebook vectors are all good choices to be paired with $c_m$. Thus there is usually a list of $N_p$ possible codebook vectors ($N_p$<B) that can be paired with $c_m$ and thus a mobile that chooses codebook vector $c_n$ would only be paired with the mobile who chose $c_m$ if $c_n$ is in the list of $N_p$ possible codebook vector pairings for codebook vector $c_m$. The list of the $N_p$ possible codebook vectors that can be paired with $c_m$ is denoted $S_m$ and note that the codebook vectors in $S_m$ is a subset of the codebook.

Once $N_p$ is selected based on the amount of desired feedback and MU-MIMO weight performance, then the set of possible vectors that can be paired with index n, $S_n$, can be found as the $N_p$ indices (m) that have the smallest of the following metric:

$$\|c_n c_n^H - P_m c_n c_n^H P_m\|_F \quad (6)$$

where and $\|A\|_F$ is the Frobenius norm (i.e., the square root of the sum of the magnitude of the elements of A). Note that, depending on the codebook structure there may be a non-zero probability that several values of n, m may result is the same value of the metric in (5). If just a few pairs need to be selected out this group of several pairs with the same metric, then any of the pairs can be chosen.

Determine the Best $N_p$ Pairs for the Scheduler

The next step is to determine which codebook vector selections should be paired. As mentioned above the set of $N_p$ possible pairs for codebook index n is denoted $S_n$ and it will be assumed that $F \geq N_u = 2$ mobiles will send feedback on the block of K subcarriers. Note that by making F>2 will give the scheduler more flexibility in pairing users and will make it more likely that two mobiles can be paired, but more feedback is required with increasing F. $N_p$, F and the codebook size, B, will determine the probability that two mobiles can be paired on a given group of subcarriers. For example if B=16, $N_p$=3, and F=2, then there is only a 3/16 chance that MU-MIMO can be performed on the subcarrier group, however if F=5 then there is about a 90% chance that MU-MIMO can be performed. The choice of $N_p$ will also affect how well the MU-MIMO weights will operate. For example if each vector in the codebook has three other vectors that are orthogonal to it, then $N_p$=3 gives a good set of MU-MIMO weights that are orthogonal to the codebook selected by the other mobile (of course because of quantization error, the MU-MIMO weights will likely not be orthogonal to the other mobile's channel). However more feedback is required (i.e., F needs to be larger) to ensure that MU-MIMO is used a reasonable percent of the time. If $N_p$=B−1 then F can equal 2 (thus minimizing the feedback required) and the probability of being able to use MU-MIMO is (B−1)/B, however the quality (i.e., orthogonality between paired mobiles) can vary quite a bit.

Determination of the Best Codebook Index

Before determining a modulation and coding rate for the group of K subcarriers, the mobiles need to determine the index of the best codebook vector, denoted $l_m$, which may accomplished using the following metric:

$$l_m = \mathrm{argmax}\left\{\sum_{k=0}^{K-1} \|H_m(k,b)c_l\|_F\right\} \quad (7)$$

$$= \mathrm{argmax} c_l^H \left\{\sum_{k=0}^{K-1} \|H_m^H(k,b)H_m(k,b)\|_F\right\} c_l$$

$$= \mathrm{argmax} c_l^H R_m c_l$$

where K is the subcarrier group size (i.e., the number of subcarriers where the MU-MIMO transmit weight is fixed) and $R_m$ is the spatial correlation matrix for the subcarrier group which is determined from the downlink channel estimates.

An alternate method of determining the index of the best codebook vector over a subcarrier group (i.e., the number of subcarriers where the MU-MIMO transmit weight is fixed) comprises of the following steps:

1. Determine a set of one or more possible interferers for a given codebook vector. The set of possible interferers may or may not comprise of other codebook vectors. The set of possible interferers may or may not be orthogonal to the given codebook vector. The set of possible interferers for a given codebook vector may or may not vary with time or frequency.
2. Determine a post-processing signal to inference plus noise ratio (SINR) for a given codebook vector based on the determined set of possible interferers. The computation of post-processing SINR may assume an minimum-mean-squared-error (MMSE) receiver.
3. Select the codebook vector with the maximum SINR as the best codebook vector.

After the choice of the best codebook index and before the determination of the modulation and coding rate, the mobile may also determine one or more possible interferers from the set of possible interferers corresponding to the best codebook index if post-processing SINRs were determined during the step of the best codebook vector selection. The mobile has a choice of several ways of determining possible interferers:

1. The interferer corresponding to an SINR closest to the mean of the SINRs for the possible interferers.
2. The interferer corresponding to the maximum or minimum SINR among the SINRs for the possible interferers.

Determination of the Modulation and Coding Rate (MCR)

Besides choosing the best codebook index, the mobile will need to select the best MCR which is typically fed back in a CQI message. Although the codebook index will be selected on a group of K subcarriers, only one CQI report is typically sent for the entire bandwidth (N≥K subcarriers where usually N>>K). The CQI is one value over the entire band to reduce the feedback and simplify the coding and scheduling operations at the base. In the preferred embodiment of the present invention the mobile determines the MCR to feed back to the base even though the mobile does not know which of the $N_p$ possible interferers will be present. The MCR/CQI is determined as follows:

1. For a group of subcarriers for use by the mobile as a resource, determine the best codebook choice for antenna weighting for that group of subcarriers. As is known in the art, one possible codebook choice maximizes transmit energy in the direction of the mobile. Additionally, mobiles will know each possible interferer based on their codebook choice. More particularly, for a particular codebook vector selected by a mobile (say codebook vector $c_n$ is selected) there will be an associated set of codebook vectors ($S_n$) that can be paired with a mobile that made that codebook selection. A different mobile that selects codebook vector $c_m$ will be paired with a mobile that selected $c_n$ only if $c_m$ is an element of $S_n$. Therefore the best codebook choice is used to determine transmit weights and also the set of $N_p$ possible interferers (i.e., possible mobiles that can be paired with the first mobile).

2. Each of the $N_p$ possible interferers will have a different associated codebook vector $c_m$. However when the base actually transmits on the downlink, only one of these interferers (and associated codebook vector $c_m$) will be selected. But since each mobile will not know beforehand which mobile they are to be paired with, the mobile that chose codebook vector $c_n$ will have to first determine the transmit weights for itself and the interferer (denoted $v_{n,m}$ and $v_{m,n}$ respectively) for each of the $N_p$ possible interferers. Then using these weights, the mobile can determine the MCR/CQI. Note that the set of weights, $v_{n,m}$ and $v_{m,n}$, are the one possible set of transmit weights, denoted by v, that the interferer with associated codebook vector $c_m$ may have if paired with the mobile that chose codebook vector $c_n$.

3. For each of the $N_p$ possible interferers, compute a potential receive signal strength from the base station to the mobile that chose codebook index n as $G_m^d(k) = \hat{H}_u(k) v_{n,m}$. Also compute a crosstalk (interference) signal from each of the $N_p$ interferers as $G_m^i(k) = \hat{H}_u(k) v_{m,n}$ for subcarriers, k, where $\hat{H}_u(k)$ is an estimate of the broadcast channel for the mobile. When completed the mobile that chose codebook index n will have an estimate of the desired signal, $G_m^d(k)$, and the interfering signal, $G_m^i(k)$ for each of the possible interferers.

4. Compute or be provided a noise estimate, $\sigma_n^2$, by measuring the noise on each subcarrier.

5. For each of the possible interferers, compute the post-reception signal to interference plus noise ratio (SINR) on each subcarrier in the group of subcarriers as a function of the desired signal, the interfering signal, and the noise estimate. For example the post-reception SINR, $\delta_m(k)$, can be determined as:

$$\delta_m(k) = \frac{|G_m^d(k)|^2}{|G_m^i(k)|^2 + \sigma_n^2} \quad (8)$$

6. Determine a single post-reception SINR from the set of possible SINR values for each interferer. For example, the interferer, m, that gives the largest average SINR across all K subcarriers can be chosen (in this case $\bar{\delta}(k) = \delta_m(k)$). Another option is to compute an average SINR over all interferers as $$\bar{\delta}(k) = \frac{1}{N_p} \sum_{m \in S_n} \delta_m(k).$$

Yet another option is to choose the single interferer, m, that gives the average SINR over all interferers (in this case $\bar{\delta}(k) = \delta_m(k)$).

7. Use the single post-reception SINR, $\bar{\delta}(k)$, on each subcarrier to determine a metric which can be mapped to the best MCR choice. The choice of MCR based on SINR could be made in one of several ways. For example, using the known in the art technique, exponential effective SIR mapping (EESM), which computes the following effective SINR over the resource from the single post-reception SINR value on each subcarrier:

$$\gamma_{\text{eff}} = -\beta \ln\left(\frac{1}{K} \sum_{k=1}^{K} e^{-\bar{\delta}(k)/\beta}\right) \quad (9)$$

where there is a different $\beta$ for the different MCR levels (i.e., a different $\beta$ for rate ½ QPSK, rate ¾ QPSK, rate ½ 16-QAM, etc.). If $\gamma_{\text{eff}}$ is greater than a certain threshold for a MCR (e.g., the threshold could be the SNR value where the performance of that MCR in Gaussian noise gives a certain frame error rate such as 10%), then that MCR is a possible candidate. The mobile may then select the MCR from the list of possible candidate MCRs that gives the highest throughput. Of course other methods known in the art can also be used to map the single post-reception SINR value to a MCR such as the received bit mutual information rate (RBIR) procedure.

FIG. 2 is a block diagram showing mobile node 200. As shown, node 201 comprises database 205, logic circuitry 203, receive circuitry 202, and transmit circuitry 201. Logic circuitry 203 preferably comprises a microprocessor controller. In the preferred embodiment of the present invention logic circuitry 203 serves as means for controlling node 200, and as means for determining an MCR for node 200. Additionally transmitter 201 and receiver 202 are common circuitry known in the art for communication utilizing a well known communication protocol. In this particular embodiment, transmitter 201 and receiver 202 are designed to operate utilizing a MU-MIMO communication system protocol. During operation, logic circuitry 203 will determine a best codebook choice for antenna weighting for a particular group of subcarriers, and then determine transmit weights for itself and each potential interferer. Using the transmit weights for itself and each potential interferer, logic circuitry 203 will determine an MCR and CQI message.

FIG. 3 is a flow chart showing operation of node 200. More particularly, FIG. 3 shows those steps taken by node 200 when determining a modulation and coding rate. The logic flow begins at step 301 where all possible groups of subcarriers that can be utilized as a resource are determined by logic circuitry 203 and a best codebook choice for each group of subcarriers (resource) is determined (step 303). As discussed above, the best codebook choice provides for maximum transmit energy in the direction of the mobile 200. Also, with each codebook choice exists a possible set of $N_p$ interferers (i.e., other mobiles) that may be paired with mobile 200, sharing the same set of subcarriers (resources). These one or more possible interferers are determined at step 304 by logic circuitry 203.

Antenna weights for the mobile are then determined by logic circuitry 203 (step 305). As described above in the MU-MIMO Weight Calculation section, the antenna weights may be based on the possible interferers and the codebook choice, or may simply be based on the codebook choice.

There can only exist one possible set of transmit antenna weights v that each interferer may have if paired with mobile 200. These weights are stored in database 205, and determined by logic circuitry 203 at step 307. The transmit weights (antenna weights) for each interferer choice maximizes transmit energy in the direction of the interferer while steering little energy in the direction of the mobile 200. In steps 309-

317 the transmit weights of the node and possible interferers are utilized by logic circuitry 203 to determine a best MCR/CQI.

At step 309, logic circuitry 203 calculates a potential receive signal strength $G_d$ and a crosstalk $G_i$ for each of the $N_p$ interferers for each potential resource. At step 311 a noise estimate is taken by logic circuitry 203 instructing receiver 202 to measure the noise of each resource group. With the signal strength, crosstalk (interference), and noise known for each of the $N_p$ interferers, for each resource group, logic circuitry 203 then calculates a post-reception quality metric for each subcarrier in each resource group (step 313). In an embodiment of the present invention, the quality metric comprises an SINR, however other quality metrics may be used (e.g., SNR, capacity measure, or signal strength). At step 315, the post-reception quality metric is then used to calculate an MCR for each potential resource from the resource group. The MCRs are then reported back to the base station via transmitter 201 as a CQI message (step 317).

While the invention has been particularly shown and described with reference to a mobile that uses a codebook to select a set of antenna weights for transmission as well as for computing CQI, the invention may be applied to mobiles that do not use a codebook for selecting antenna weights. Specifically this invention may be applied to mobiles that employ channel reciprocity based methods like uplink sounding for sending transmit antenna weight information to the base-station. This invention may also be applied to mobiles that employ analog feedback based methods like covariance or Eigen-vector feedback for sending transmit antenna weight information to the base-station. In such cases the mobile may use a codebook specifically for determining CQI but not for determining transmit antenna weights. It is intended that such changes come within the scope of the following claims:

The invention claimed is:

1. A method for a mobile to determine a best modulation and coding rate for a resource within a communication system employing adaptive modulation and coding and transmit spatial division multiple access, the method comprising the steps of:
   determining, by the mobile, a codebook choice for the resource;
   determining, by the mobile, one or more possible interferers;
   determining, by the mobile, antenna weights for the mobile;
   determining, by the mobile, antenna weights for the possible interferers based on the codebook choice; and
   using, by the mobile, the antenna weights for one or more possible interferers and the antenna weights for the mobile to determine a modulation and coding rate for the mobile.

2. The method of claim 1 wherein the antenna weights for the mobile maximizes transmit energy in the direction of the mobile while steering a null in the direction of one or more interferers.

3. The method of claim 1 wherein the antenna weights for the possible interferers maximizes transmit energy in the direction of an interferer while steering a null in the direction of the mobile.

4. The method of claim 1 wherein the one or more possible interferers are determined based on the codebook choice.

5. The method of claim 1 wherein the antenna weights for the mobile and the antenna weights for one or more possible interferers comprise base station transmit antenna weights used by the base station when transmitting information to the mobile and the one or more interferers.

6. The method of claim 1 wherein the step of determining antenna weights for possible interferers comprises the steps of:
   determining a signal to interference plus noise ratio (SINR) for the mobile based on signal strength and interference for different choices of possible interferers; and
   selecting antenna weights from the codebook for the possible interferers based on the determined SINR for the mobile.

7. The method of claim 1 wherein the step of using the antenna weights for one or more possible interferers and the antenna weights for the mobile to determine a modulation and coding rate for the mobile comprises the steps of:
   computing a potential receive signal strength for the mobile;
   computing an interference for one or more possible interferers; and
   determining the modulation and coding rate based on the computed receive signal strength and the interference.

8. The method of claim 7 wherein the step of determining the modulation and coding rate comprises the steps of:
   determining a signal to interference plus noise ratio (SINR) over all possible interferers based on the signal strength and the interference for each of the possible interferers; and
   determining the modulation and coding rate based on the average SINR over all possible interferers.

9. The method of claim 7 wherein the step of determining the modulation and coding rate comprises the steps of:
   determining a possible interferer that provides the highest signal to interference plus noise ratio (SINR) to the mobile over the resource;
   determining the interference for the interferer that provides the highest average SINR; and
   determining the modulation and coding rate based on the receive signal strength and the interference for the interferer that provides the highest average SINR.

10. The method of claim 7 wherein the step of determining the modulation and coding rate comprises the steps of:
    determining a possible interferer that is closest to the signal to interference plus noise ratio (SINR) over all possible interferers over the resource;
    determining the interference for the interferer that is closest to the average SINR over all possible interferers and
    determining the modulation and coding rate based on the receive signal strength and the interference for the interferer that is closest to the average SINR over all possible interferers.

11. The method of claim 7 further comprising the step of:
    computing a noise estimate for the resource; and
    wherein the modulation and coding rate is additionally based on the noise estimate.

12. The method of claim 7 further comprising the step of:
    determining a post-reception signal to interference plus noise ratio (SINR) from the receive signal strength, the interference for one or more possible interferers, and the noise estimate; and
    wherein the modulation and coding rate is based on the SINR.

13. The method of claim 1 further comprising the step of:
    transmitting the modulation and coding rate to a base station in a channel quality indication (CQI) message.

14. A mobile to determine a best modulation and coding rate for a resource within a communication system employing adaptive modulation and coding and transmit spatial division multiple access, the mobile performing the steps of:

determining, by the mobile, a codebook choice for the resource;

determining, by the mobile, one or more possible interferers;

determining, by the mobile, antenna weights for the mobile;

determining, by the mobile, antenna weights for the possible interferers based on the codebook choice; and using, by the mobile, the antenna weights for one or more possible interferers and the antenna weights for the mobile to determine a modulation and coding rate for the mobile.

15. The mobile of claim 14 wherein the antenna weights for the mobile maximizes transmit energy in the direction of the mobile while steering a null in the direction of one or more interferers.

16. The mobile of claim 14 wherein the antenna weights for the possible interferers maximizes transmit energy in the direction of an interferer while steering a null in the direction of the mobile.

17. The mobile of claim 14 wherein the one or more possible interferers are determined based on the codebook choice.

18. A mobile to determine a best modulation and coding rate for a resource within a communication system employing adaptive modulation and coding and transmit spatial division multiple access, the mobile comprising:

a database;

logic circuitry determining a codebook choice for the resource, determining one or more possible interferers, determining antenna weights for the mobile, determining antenna weights for the possible interferers from the database and based on the codebook choice, and using the antenna weights for one or more possible interferers and the antenna weights for the mobile to determine a modulation and coding rate for the mobile.

19. The mobile of claim 18 wherein the antenna weights for the mobile maximizes transmit energy in the direction of the mobile while steering a null in the direction of one or more interferers.

20. The mobile of claim 18 wherein the antenna weights for the possible interferers maximizes transmit energy in the direction of an interferer while steering a null in the direction of the mobile.

* * * * *